United States Patent [19]

Horste et al.

[11] 4,338,519
[45] Jul. 6, 1982

[54] ADJUSTABLE BLIP SENSOR INTERFACE FOR MICROFILM READER AND MICROFILM READER PRINTERS

[75] Inventors: Stephen C. Horste, Pinckney; Ronald B. Bergman, Ypsilanti, both of Mich.

[73] Assignee: Visual Systems Corporation, Southfield, Mich.

[21] Appl. No.: 174,395

[22] Filed: Jul. 31, 1980

[51] Int. Cl.³ .............................................. H01J 5/02
[52] U.S. Cl. ..................................... 250/239; 250/548
[58] Field of Search ............... 250/239, 227, 570, 548, 250/557; 353/26 A

[56] References Cited

U.S. PATENT DOCUMENTS 4,207,473  6/1980  Nakatani et al. ............. 353/26 A X

*Primary Examiner*—David C. Nelms
*Assistant Examiner*—Darwin R. Hostetter
*Attorney, Agent, or Firm*—Cullen, Sloman, Cantor, Grauer, Scott & Rutherford

[57] ABSTRACT

An adjustable sensor for detecting marks or "blips" on a strip of microfilm. The sensor includes a pair of individually adjustable sensing modules separately adjustably mounted on a mounting plate. Preferably the modules are magnetically mounted to the plate. Each sensing module includes magnet means and an electronic circuit encapsulated within a housing and an arm for adjusting the position of the housing on the mounting plate. A detector, preferably a fiber optic wand, is connected to the electronic circuit and partially encapsulated within the housing. The fiber optic wand extends outwardly of the housing to detect the blips on the microfilm.

10 Claims, 3 Drawing Figures

ADJUSTABLE BLIP SENSOR INTERFACE FOR MICROFILM READER AND MICROFILM READER PRINTERS

BACKGROUND OF THE INVENTION

This invention relates generally to the equipment for retrieving data from documents which have been recorded on individual frames of a reel of microfilm. More particularly, the present invention relates to an improved interface apparatus for detecting markers on the frames of a reel of microfilm so that a microfilm reader or a microfilm reader printer can be electronically controlled to search for specific documents on a reel of microfilm.

In the initial recording of documents on microfilm, it is common to have each of the page of the document recorded on a separate frame of the film. Hence each frame of the microfilm corresponds to a single page of a document. Typically, the microfilming apparatus places a dark spot called a marker or a "blip" on each frame of the microfilm. Then an index is prepared identifying the document and indicating the microfilm frame on which the document is recorded.

Furthermore, a technique has been employed called batch coding where two distinct tracks on the microfilm are used for blips. A blip is placed in a first track corresponding to each document recorded on the microfilm. A blip is provided in the second track for each group of documents commonly referred to a file or a batch. Since each reel of microfilm may have several thousand frames, it may be appreciated that when it becomes necessary to look at a particular frame of the microfilm, to study a specific document, it is desirable to be able to quickly advance the microfilm through the microfilm reader and to stop the microfilm automatically at the frame on which the particular document has been recorded. The advancing of the microfilm through the reader to locate a particular document is called "scanning" or "searching". Devices already exist for automatically advancing the microfilm through a reader and for sensing and counting the markers or blips in an attempt to scan or search and automatically stop the movement of the microfilm at the desired frame.

However, prior to the present invention, such devices did not permit adjustably positioning the sensors which detect the blips on the microfilm. The sensors were permanently positioned and, therefore, any slight misadjustment resulted in inaccurate counting of blips or markers thus causing the microfilm to be stopped at an incorrect frame.

Furthermore, many microfilm readers and microfilm reader printers do not include the capability of detecting blips. Prior to the present invention, there were no convenient devices which could be retrofit as attachments to the microfilm reader or microfilm reader printer. That is to say, when it was desired to retrofit a microfilm reader or microfilm reader printer prior to the present invention, it was necessary to replace some or all of the microfilm gate area, i.e., the region where the microfilm passes over a light source and is projected onto the screen of the microfilm reader.

The present invention overcomes the shortcomings of the prior art by providing a new and improved universal blip sensor which may be retrofit on already existing microfilm readers and microfilm reader printers and which provides for adjustability of the sensors to provide more accurate detection of microfilm blips.

SUMMARY OF THE INVENTION

The present invention provides a microfilm blip detector which provides the optical and the electrical interface between the microfilm and the apparatus which controls the scanning or searching through the microfilm. The present invention provides blip sensors which are adjustable and which may be retrofit on existing microfilm reader printers without the need for replacing all or even part of the film gate area.

According to the principles of the present invention, a plurality of blip sensor modules are provided, one for each of the tracks on the microfilm. These two sensors are adjustably mounted, via magnets, to a mounting plate and positioned to extend into the film gate area. Each sensor includes a fiber optic wand to be positioned over the film gate area and aligned with a microfilm blip track.

BRIEF DESCRIPTION OF THE DRAWINGS

The various objects and advantages of the present invention will become more apparent upon reading the following detailed description of the invention taken in conjunction with the drawings.

In the drawings, wherein like reference numerals identify corresponding components.

DETAILED DESCRIPTION OF THE INVENTION

Figure 1:
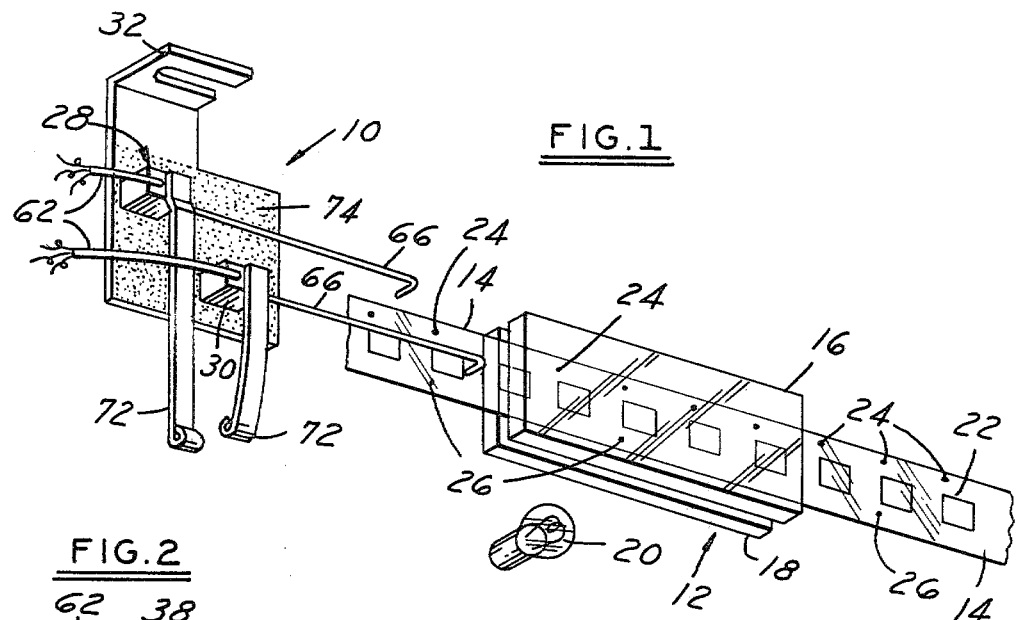
FIG. 1 is a perspective illustration of the adjustable sensor of the present invention positioned over a microfilm gate area.

With reference to the drawings, the apparatus 10 of the present invention is diagrammatically illustrated as being positioned over the microfilm gate area 12 of a conventional microfilm reader or microfilm reader-printer. The gate area 12 of a conventional microfilm reader refers to that area where the microfilm 14 passes between upper and lower glass plates 16, 18, respectively. A source of light 20 is positioned below the lower plate 18 and light shines through the plates and the microfilm. Suitable lenses, not shown, are provided to project the image from the microfilm onto a screen.

In the recording of documents on the microfilm, each document is recorded on a separate frame of the microfilm and typically a single frame 22 of microfilm is centered relative to the edges of the film. On one side of the document a blip or mark 24 is providd on the film, one blip for each document, to facilitate scanning or searching for a particular document. The blips 24 are alligned in what is referred to as a first track on the microfilm 14. On the opposite side of the microfilm from the first track is a second track having blips 26 therein. Typically, a blip 26 is not placed on the microfilm corresponding to each frame or each document but rather for the first document in a particular series of documents or file. This is called file coding or batch coding.

Prior to the present invention, in order to count the frames of microfilm, it was necessary to modify the film gate area by providing permanent detectors, one detector alligned with each track, to detect the blips. Typically, this was accomplished by providing a replacement upper plate 16 having optical detectors attached thereto. However, such detectors were permanently secured to the upper plate and were non-adjustable. Furthermore, it was difficult, expensive and time consuming to retrofit existing microfilm readers or microfilm reader printers with replacement gate areas or parts thereof.

According to the principles of the present invention, the apparatus 10 provides a plurality of sensing modules 28, 30 one for each track on the microfilm. The sensing modules are adjustably secured to a mounting bracket 32 which mounting bracket may be removeably secured to the microfilm reader adjacent the film gate area.

Figure 2:
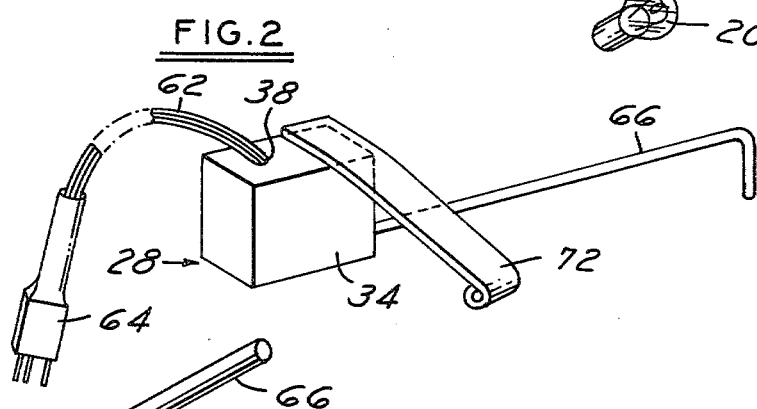
FIG. 2 is a perspective illustration of one adjustable sensor module of the present invention.
Figure 3:
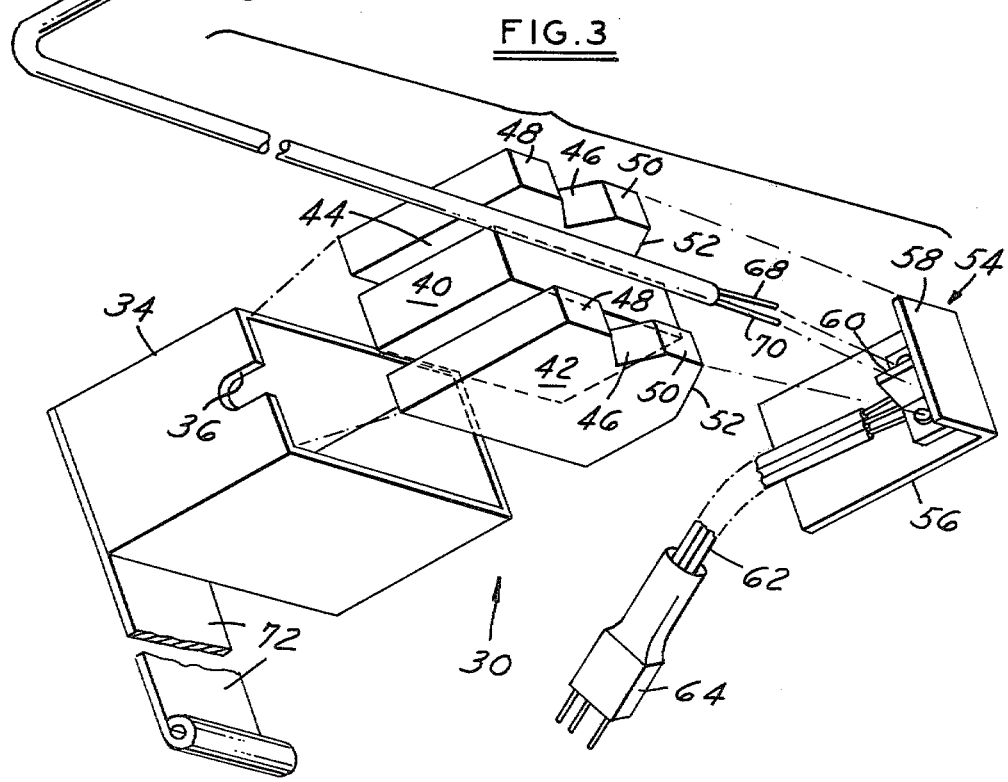
FIG. 3 is a perspective, exploded view of a single sensor module of the present invention.

In order to understand the invention, reference should now be had to FIGS. 2 and 3 for an explanation of a single sensing module. The sensing module includes a generally rectangular plastic housing 34 having an open top and a notch 36 cut in one short end thereof adjacent the open top. The housing is closed on all four sides and on the bottom and includes an aperture 38 (see FIG. 2) in the bottom to accomodate electrical wires as will be described hereinafter.

Means are provided to secure the housing 34 to the bracket 32. Specifically, in a preferred embodiment of the present invention, a thin, flat rectangular permanent magnet 40 is provided with pole pieces 42, 44 on opposite sides of the magnet. These pole pieces are preferably made of low carbon steel and are slightly larger than the magnet in length and height. When the magnet and the pole pieces are assembled, a recess is defined above the magnet 40 between the pole pieces 42, 44. Each of the pole pieces 42, 44 includes a transverse notch 46 in its upper face to separate the upper face into two contact points 48, 50. Since the pole pieces are made of low carbon steel, when the magnet and pole pieces are placed together, the magnetic flux provides a four-point contact through the pole pieces. The upper face of each pole piece includes a tapered corner 52 to provide clearance for the remainder of the sensing module within the housing 34 as will be explained.

Each sensing module includes a sensor board 54 formed as a thin, flat L-shaped member with a vertical long leg 56 of the L-shaped sensor board positioned downwardly into the housing and with a horizontal short leg 58 extending over the tapered corner 54 of the pole pieces. The sensor board, which is preferably made of ceramic, includes a plastic projection 60 in the shorter leg 58 as will be hereinafter explained. The electronics associated with the sensing module is bonded to the ceramic sensor board and extends outwardly as a plurality of electrical wires 62, through the aperture 38 in the bottom of the housing and thereafter into a plug type connector 64.

According to the principles of the present invention it is preferred to optically detect the blips on the microfilm and, to accomplish this objective a fiber optic wand 66 is provided. The fiber optic wand, which may be bent as appropriate to assist in insuring proper positioning of the sensing module relative to the film gate area, includes, in the preferred embodiment, two fiber optic strands 68, 70. These two strands extend on opposite sides of the projection 60 and each strand is connected to a photo transistor as part of the electronics of the sensing module. Upon detection of the change of light intensity as a blip passes between the light source and the ends of the fiber optic wand, the photo sensitive transitor provides a change in output to indicate that a blip has passed by the fiber optic wand. This, of course, is conventional. The use of two strands, which are adjacent to each other in the film gate area for a single sensing module, enables the microfilm apparatus to determine the direction of movement of the microfilm, i.e., advancing or rewinding of the film.

When a sensing module is assembled with the magnet and pole pieces within the housing and with a sensing board in the housing, part of the fiber optic wand extends outwardly through the notch 36 while the remainder of the fiber optic wand, together with the magnets, pole pieces and sensor board are encapsulated in an insulating material such as epoxy as is conventional for electronic assemblies of this type.

Means are provided for adjusting the positioning of an individual sensing module relative to the mounting bracket 32. Specifically, a stainless steel arm 72 is secured to the housing 34 and extends outwardly of the housing transverse to the longitudinal axis of the fiber optic wand. In this way the arm 72 may be lined up perpendicular to the path of travel of the microfilm and, by moving the arm 72, the individual sensing modules may be moved forward and back, side to side and/or rotated relative to the mounting bracket to thus provide accurate adjustment of the fiber optic wand 66 and the entire sensing module relative to the tracks for the blips 24, 26.

To reduce the possibility of accidental movement of each sensing module relative to the mounting bracket 32, it is preferred that the surface of the mounting bracket where the sensing modules are magnetically attached be provided with a region 74 coated with a conventional hot melt glue. The heat from the light 20 in the film gate area is sufficient to melt the glue partially to provide seating of the sensing modules on the bracket. Thereafter, should it be desired to adjust the position of the sensing modules, movement of the arm 72 associated with each sensing module will permit suitable adjustment of the module relative to the bracket and the film gate area and, thereafter, the light 20 will re-melt the glue to seat the sensing modules in their new positions.

Where the present invention is positioned in the film gate area, an optical interface and an electrical interface are provided between the microfilm and the electronics which controls the movement of the microfilm for searching. Specifically, since the conventional microfilm controller advances the film while counting the blips, until the desired frame is in the gate area, the present invention optically senses the blips, and provides electrical pulses, one for each blip, to the controller.

The foregoing is a complete description of the preferred embodiment of the present invention. Various changes and modifications may be made without departing from the spirit and scope of the present invention.

The invention, therefore, should be limited only by the following claims.

What is claimed is:

1. An adjustable blip sensor interface for detecting blips on a strip of microfilm or the like said blips being recorded on at least one track on the microfilm, said sensor adapted to be mounted in the film gate area of a microfilm reader or microfilm reader printer, comprising:

a mounting plate adapted to be secured adjacent to the film gate area; and at least one sensor module magnetically mounted to said mounting plate;

said sensor module comprise a housing, magnetic means for positioning said sensor module, and detector means secured to said housing and positionable over the film gate area; and means for adjusting the position of said sensor module relative to said mounting plate.

2. The invention as defined in claim 1 wherein said magnet means and at least a portion of said detector means are encapsulated within said housing.

3. The invention as defined in claim 1 wherein said magnet means provides a four point contact with said mounting plate.

4. The invention as defined in claim 1 wherein said mounting plate includes hot melt glue to seat the housing on said bracket.

5. The invention as defined in claim 1 and including at least two sensor modules.

6. An adjustable sensor module to be positioned in the film gate area of a microfilm reader or microfilm reader printer for detecting blips on a strip of microfilm or the like, said sensor module comprising:

magnetic means for positioning said sensing module, said magnetic means being positioned within said housing;

detector means secured to said housing; said magnetic means and least a portion of said detector means being encapsulated within said housing; and a non-magnetic arm extending outwardly from said housing for adjusting the position of said sensor module.

7. The invention as defined in claim 6 wherein said detector means is an optical sensor.

8. The invention as defined in claim 6 wherein said detector means includes fiber optics for detecting changes in light intensity through said microfilm.

9. The invention as defined in claim 6 wherein said magnetic means and at least part of said detector means are encapsulated in an insulating material within said housing and wherein said magnetic means provides a four point magnetic contact.

10. The invention as defined in claim 6 wherein said magnetic means includes a plurality of pole pieces for providing multi-point magnetic contact.

* * * * *